(12) United States Patent
Miyashita et al.

(10) Patent No.: US 6,714,205 B1
(45) Date of Patent: Mar. 30, 2004

(54) IMAGE DATA PROCESSING METHOD AND APPARATUS, AND IMAGE PROCESSING SYSTEM

(75) Inventors: Tomoyuki Miyashita, Kodaira (JP); Kentaro Matsumoto, Higashikurume (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/373,716

(22) Filed: Aug. 13, 1999

(30) Foreign Application Priority Data

Aug. 21, 1998 (JP) .......................................... 10-236032
Aug. 31, 1998 (JP) .......................................... 10-245097

(51) Int. Cl.⁷ ............................................. G06F 13/00
(52) U.S. Cl. ..................... 345/536; 345/530; 382/233; 382/305
(58) Field of Search ................................ 345/530, 531, 345/536, 501; 382/232, 233, 305

(56) References Cited

U.S. PATENT DOCUMENTS 5,517,609 A * 5/1996 Guillemaud et al. .......... 501/14
6,184,860 B1 * 2/2001 Yamakawa .................. 345/146
6,222,551 B1 * 4/2001 Schneider et al. ........... 345/419
6,317,757 B1 * 11/2001 Sakamaki .................... 707/502

* cited by examiner

Primary Examiner—Matthew C. Bella
Assistant Examiner—Mackly Monestime
(74) Attorney, Agent, or Firm—Fitzpatrick, Cella, Harper & Scinto

(57) ABSTRACT

Disclosed are an image data processing method and apparatus for reading image data out of a memory and processing the image data, in which the memory stores image data representing an image as a collection of a plurality of partial images and from which the image data can be read out upon specifying image data in units of the partial images. If sequence information indicating the display sequence of the plurality of partial images of the image is stored in association with the image, then the partial images can be read out and displayed in accordance with the sequence information. By displaying completed partial images upon appending specific information thereto, it is possible to distinguish partial images whose display has been completed on a screen from partial images whose display has not been completed on the screen.

40 Claims, 18 Drawing Sheets

| DISPLAY LIST PROPERTY | VALUE |
|---|---|
| 0 | 6 |
| 1 | 11 |
| 2 | 16 |
| 3 | EOL |

F I G. 5
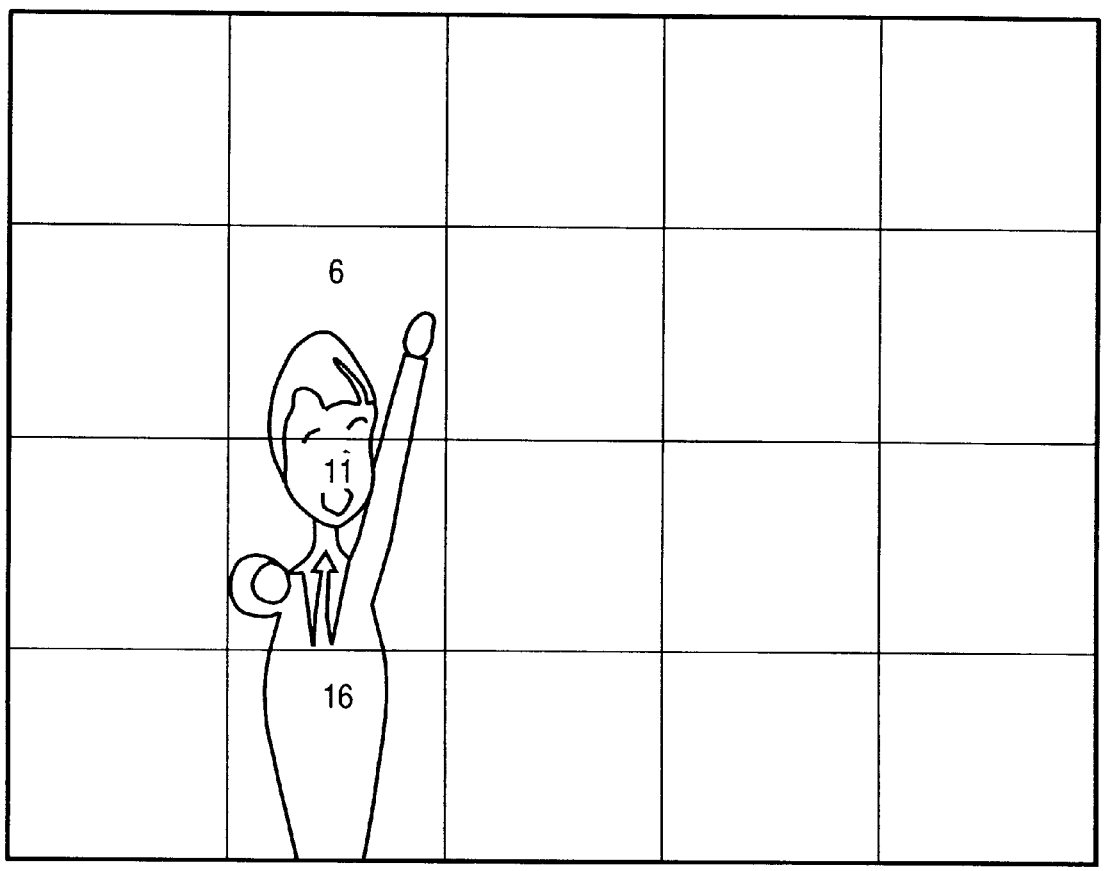

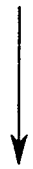

FIG. 9A
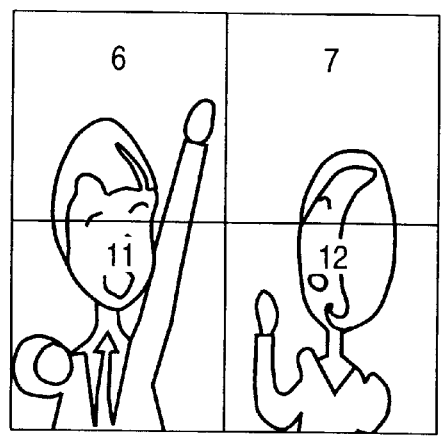
FIG. 9B
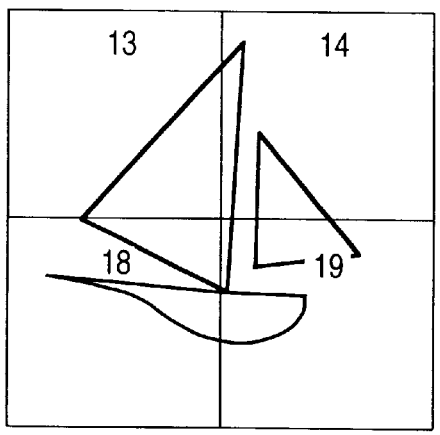
FIG. 9C
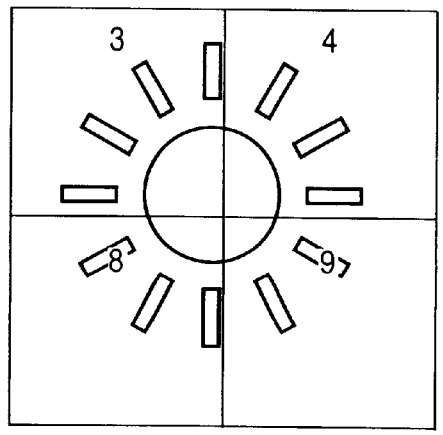

FIG. 14

IMAGE-EXTRACTION REQUEST LIST

| PRIORITY | TILE NO |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| . | . |
| . | . |
| 49 | EOL |

| IMAGE HEADER PORTION | IMAGE FORMAT IDENTIFIER |
| --- | --- |
| | FILE SIZE |
| | NUMBER OF PIXELS IN X DIRECTION (WIDTH) |
| | NUMBER OF PIXELS IN Y DIRECTION (HEIGHT) |
| | DEPTH-DIRECTION SIZE |
| | COMPRESSED OR NOT |
| | RESOLUTION |
| | OFFSET TO BITMAP DATA |
| | SIZE OF COLOR PALETTE |
| | COLOR-PALETTE DATA |
| IMAGE DATA PORTION | BITMAP DATA |

IMAGE DATA PROCESSING METHOD AND APPARATUS, AND IMAGE PROCESSING SYSTEM

BACKGROUND OF THE INVENTION

This invention relates to an image data processing method and apparatus as well as an image processing system for displaying an image that has been divided into a plurality of partial images.

Owing to the widespread use of such devices as digital cameras and scanners in recent years, there is rapidly increasing opportunity to capture desired an image and store image data representing the image on a storage medium such as a hard disk. Further, as a result of the proliferation of communications networks such as the Internet, it has become common for image data being managed by a remote computer to be downloaded to and displayed by a user's own computer via the communications network.

FIG. 17 illustrates an example of an image format commonly used to store such image data. An image file is divided into a header portion and an image data portion, as shown in FIG. 17. Information necessary when data is read from this image file and auxiliary information which describes the content of an image generally are stored in the header portion. In the example of FIG. 17, the information stored in the header portion is information such as an image format identifier indicating the image format, file size, number of pixels in the X direction indicating the width of the image, number of pixels in the Y direction indicating the height of the image, depth-direction size (number of bits) representing the number of tones (number of colors) of the image, whether or not the image has been compressed, resolution, address offset toward a storage location at which image data has been stored in a bitmap format, and information (size data) on the color palette being used.

The image data portion stores image data in a bitmap format. Typical examples of such an image format are Microsoft's BMP format and Compuserve's GIF format.

When the image data portion having such a format is read out and displayed using a program, the usual practice employed to display all of the image data in the image data portion is to read out the image data from the beginning of the image data portion and display the image data successively from the upper left of the screen in raster-scan order.

Thus, in the prior art, the order in which image data is read out of an image file and displayed is fixed. Consequently, even if the intention of a producer of image data is to have someone first display and view only a part of the image before viewing the whole image, a technique for achieving this is not available.

FIG. 18 illustrates an example in which an image is displayed upon being divided into a plurality of tiles. According to this method, the image of interest is divided into seven tiles in the vertical direction and seven tiles in the horizontal direction using a plurality of tiles each of which comprises 64×64 pixels. Thus, the image is constructed using a total of 49 tiles. The numerals assigned to the tiles in FIG. 18 indicate the tile numbers. The tiles are numbered consecutively, i.e., "0", "1", "2" "3", . . . , starting from the upper left of the image. In this example, each tile is displayed together with a border in order to explicitly show that the image has been divided into tiles. Examples of formats for thus dividing an image into a plurality of tiles include FlashPix and TIFF, and the respective standards have widely disclosed.

When such an image is displayed in enlarged form, the method generally used in the prior art involves changing the size of the image in FIG. 18 and then successively displaying each of the tile images starting from the tile at the upper left of the image of FIG. 18. Such an example is depicted in FIG. 19. FIG. 19 illustrates a state in which the enlargement and display of the image of the personal computer contained in the image of FIG. 18 is currently in progress. Here each tile in FIG. 19 is displayed upon being enlarged to a size that corresponds to four of the tiles shown in FIG. 18. It should be noted that, in a manner similar to that of FIG. 18, the numerals appearing in the tiles of FIG. 19 indicate the numbers of the tiles into which the enlarged displayed image has been divided. An area shown at 190 is an area in which an image that has already undergone enlargement processing is displayed, while an area shown at 191 is one in which enlargement processing has not yet been completed. The display in this area 191 is similar to that shown in FIG. 18. It should be noted that the borders indicating the boundaries of the tiles in FIGS. 18 and 19 are shown for the sake of convenience in order to clarify the individual tiles; they are not actually displayed on the screen.

Thus, with the prior art, when an image that has been divided into tiles is displayed in enlarged form, as shown in FIG. 19, it is difficult to discern what part of the displayed image is the enlarged part. When image data supplied from a server or the like is being displayed upon being received via a communication line having a low data transmission speed, the above-mentioned problem arises particularly in a case where the server is instructed to enlarge the image, whereby the enlarged image is displayed upon being received from the server via the communication line.

SUMMARY OF THE INVENTION

Accordingly, an object of the present invention is to provide an image data processing method and apparatus as well as an image processing system in which when an image based upon image data is displayed and the image is composed of a plurality of partial images, the partial images can be displayed in a desired sequence.

Another object of the present invention is to provide an image data processing method and apparatus as well as an image processing system in which partial images of a certain image can be requested in a desired sequence via a network, the image data received in the requested sequence and displayed in this sequence.

Another object of the present invention is to provide an image data processing method and apparatus as well as an image processing system in which when a certain image is displayed in a form obtained by combining partial images, it is easy to discern how far display of the partial images has been completed.

A further object of the present invention is to provide an image data processing method and apparatus as well as an image processing system in which when a certain image is displayed as a collection of partial images, the sequence in which the partial images are displayed can be decided and it is easy to discern how far display of the partial images has been completed.

Yet another object of the present invention is to provide an image data processing method and apparatus as well as an image processing system in which partial images of a certain image can be requested in a desired sequence via a network, the image data can be received in the requested sequence and can be displayed in this sequence, and in which it is easy to discern how far display of the partial images has been completed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 5 is a diagram showing an example of the state of a display when tiles that have been specified by the display list property of the first embodiment are finished being displayed;

FIGS. 9A to 9C are diagrams useful in describing a state in which tiles are displayed successively in a rectangular area equivalent to 2×2 tiles;

FIG. 14 is a diagram showing an example of the organization of data in an image-extraction request list according to the third embodiment;

FIG. 17 is a diagram showing an example of a generally used format of a stored image;

DESCRIPTION OF THE PREFERRED EMBODIMENTS

Preferred embodiments of the present invention will now be described in detail with reference to the accompanying drawings.

[First Embodiment]

Figure 1:
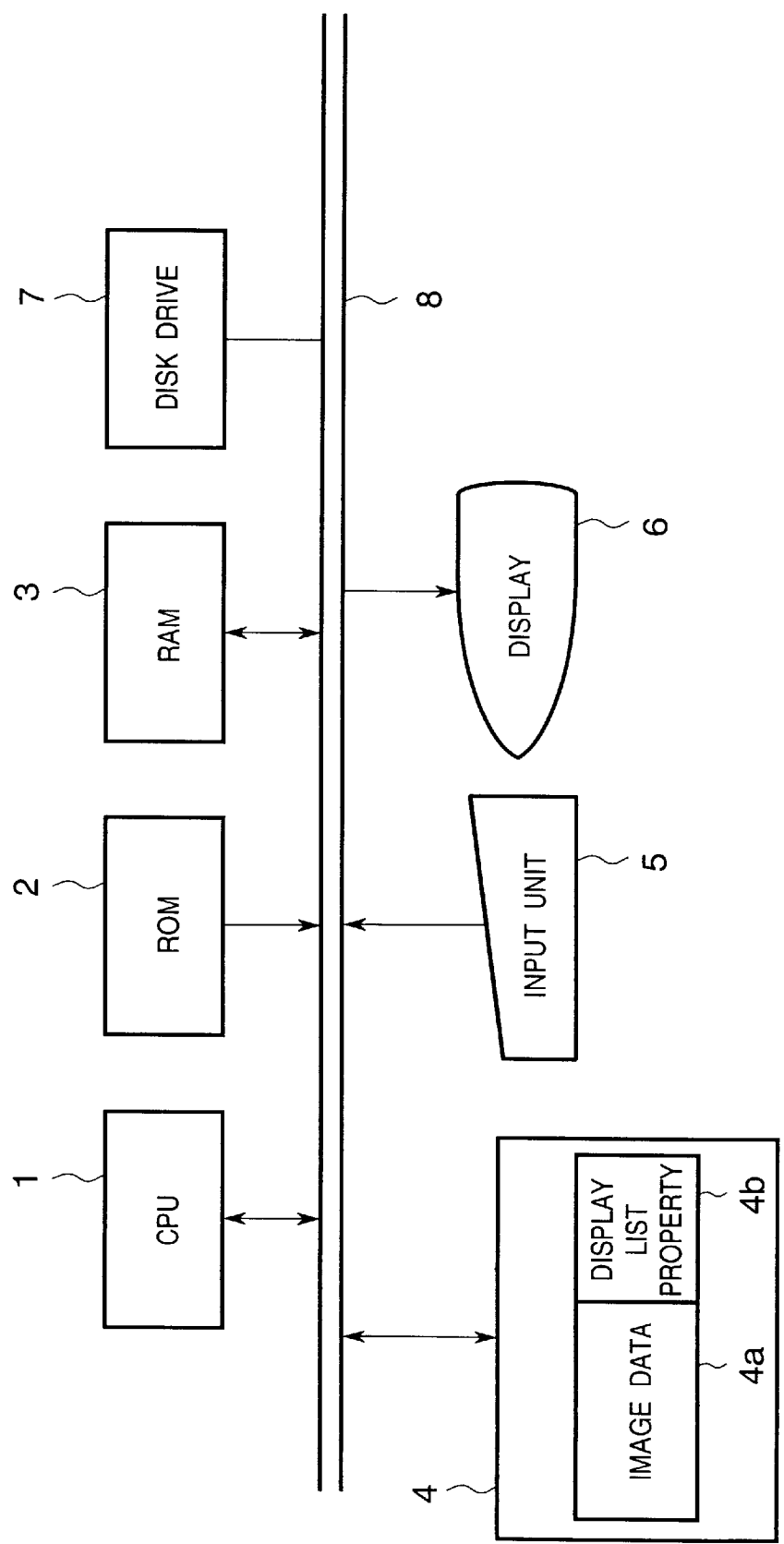
FIG. 1 is a block diagram illustrating the construction of an image processing apparatus according to a first embodiment of the present invention.

FIG. 1 is a block diagram illustrating the construction of an image processing apparatus according to a first embodiment of the present invention.

As shown in FIG. 1, the apparatus includes a CPU 1 for executing a variety of processing in the image processing apparatus of this embodiment in accordance with control programs that have been stored in a ROM 2 or RAM 3. The ROM 2 stores various control programs executed by the CPU 1, as mentioned. The RAM 3 stores a control program, which is to be executed by the CPU 1, loaded from an external storage device 4, and provides a work area which the CPU 1 employs to implement a variety of control operations.

The external storage device 4, such as a hard disk, stores various control programs (application programs) and image data. An input unit 5, which has a keyboard and pointing device, enables a user to input various commands and the like to the CPU 1. A display 6 presents a variety of displays, such as an image display based upon specified image data, under the control of the CPU 1. Further, a storage medium such as a floppy disk, CD-ROM or magneto-optic disk is loaded into a disk drive 7 so that various programs and data as well as image data that have been stored on the storage medium can be input and image data or the like can be written to the storage medium. A bus 8 connects these components to the CPU 1. According to this embodiment, it is assumed that a control program for implementing control indicated by a flowchart described later is read out of the storage medium loaded in the disk drive 7 and is stored in the RAM 3 before being executed.

Image data 4a is stored in the external storage device 4. The image data 4a is managed upon being divided into image data corresponding to a plurality of partial images (referred to as "tiles" below), and the image data can be read out and displayed is individual tile units.

Figures 2, 3:
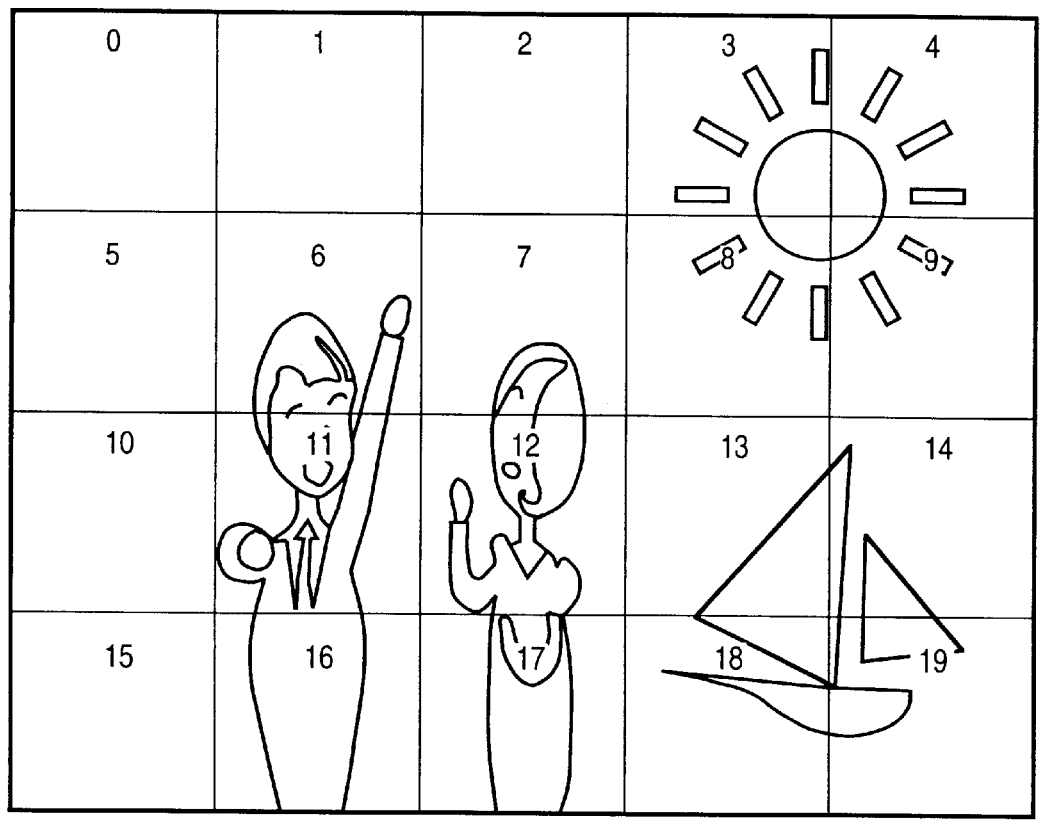
FIG. 2 is a diagram showing an example in which an image has been divided into a plurality of tiles.
FIG. 3 is a diagram showing an example of the organization of data of a display list property according to a first embodiment of the present invention.

FIG. 2 is a diagram showing an example in which an image has been divided into a plurality of tiles. In this example, an image of interest is divided into four tiles in the vertical direction and five tiles in the vertical direction, for a total of 20 tiles. The numerals in the Figure indicate the tile numbers. The tiles are numbered consecutively, i.e., "0", "1", "2" "3", . . . , starting from the upper left of the image. These numbers are used as the identification numbers of the respective tiles.

Well-known examples of image formats capable of thus dividing an image into a plurality of tiles and reading out the image in tile units are FlashPix and TIFF. FlashPix is a format provided in 1996 by four corporations, namely Kodak, Hewlett-Packard, LivePicture and Microsoft, and the specifications have been widely disclosed. Further, TIFF is a widely known format developed by Adobe, the current version of which is 6.0. The specifications of this format also have been widely disclosed.

A display list property 4b which indicates the sequence in which the tile images are displayed is appended to the data of each image that has been stored in the external storage device 4.

FIG. 3 is a diagram showing an example of the organization of data of a display list property according to this embodiment.

In this example, a tile number "6" has been recorded as a property 0, a tile number "11" as a property 1, and a tile number "16" as a property 2. An EOL (End of List) code indicating the end of the list has been set as property 3. According to the display list property shown in FIG. 3, tiles 6, 11, 16 at which a man is displayed have been specified in the image of FIG. 2.

Described next will be the operation through which the image data 4a that has been stored in the external storage device 4 is displayed based upon the display list property 4b.

Figure 4:
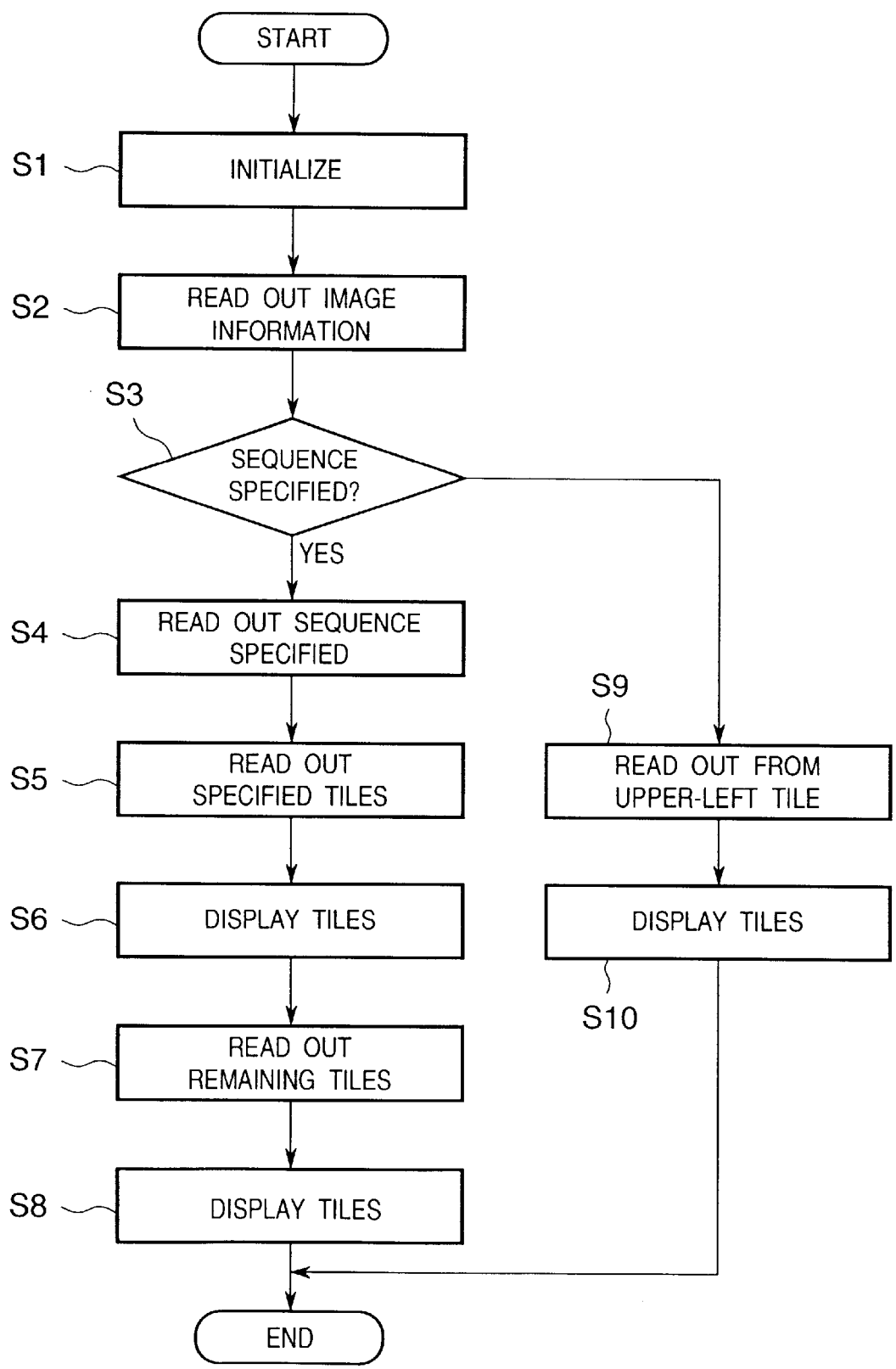
FIG. 4 is a flowchart useful in describing an image display procedure according to the first embodiment.

FIG. 4 is a flowchart useful in describing the procedure of an image display operation in the image processing apparatus according to the first embodiment of the present invention.

This processing is started using the input unit 5, for example, to specify the image data that is to be displayed. A memory area (RAM) necessary to run the program is reserved and initial values are set at step S1. This is followed by step S2, at which information needed to display the specified image data 4a is acquired from the image header (see FIG. 17). Information acquired from the image header includes numbers of pixels of the image in the vertical and horizontal directions, the number of bits of image data per pixel, the compression scheme, size and number of the tiles, etc. If the display list property 4b which indicates the order in which the tiles are to be displayed has been set, then this list data is read in at step S2.

Next, at step S3, it is determined whether the display list property 4b exists in the image information read out at step S2. If the display list exits, then control proceeds to step S4, where the content of the display list property 4b is read out. The fact that the display list property 4b exists means that the order of display of the tiles when the image is displayed has been set at the intention of the producer of the image. Accordingly, tiles are read out and displayed in the order specified by the display list property 4b. Specifically, at step S5, image data corresponding to the tiles is read out in the order registered in the display list property 4b (in the example of FIG. 3, the image data of tiles "6"→"11"→"16" is read out in this order). The image data of each tile thus read out is displayed immediately at step S6.

FIG. 5 is a diagram showing an example of the state of a display when tiles that have been specified by the display list property 4b are finished being displayed at step S6.

Tiles that have not been specified by the display list property 4b are not displayed at this time. However, the frame border of the entire image, which is decided based upon the image size (numbers of pixels in the X and Y directions) contained in the image header information acquired at step S2, is displayed. Tiles that have not been registered in the display list property 4b may be displayed as is or may be displayed using desired images (desired colors or texture).

After tiles specified by the display list property 4b have thus been displayed, the image data of the remaining tiles is read out at step S7. Then, at step S8, the image data of the tiles read out at step S7 is displayed in successive fashion. It should be noted that the order in which the remaining tile images are displayed at steps S7 and S8 is assumed to be that of the usual order of display, namely horizontally rightward from the upper left of the image (tiles 0→4, 5→9, . . . , 15→19). The result of presenting a display in this manner is similar to the example of the display shown in FIG. 2.

In a case where the display list property 4b is not found in the image information read out at step S2, control proceeds from step S3 to step S9. Here tile data is read out successively from partial images at the upper left of the image and the individual tiles are displayed at step S10 in accordance with this sequence.

In accordance with the first embodiment, as described above, one image is divided into partial image areas (tiles), an identification number is assigned to each partial image and a display list property indicating the display sequence of the partial images is stored in association with the image data. As a result, the image can be displayed in accordance with the display sequence of the partial images intended by the producer of the image data.

[Second Embodiment]

The first embodiment described above is implemented by a stand-alone type of computer. However, the method of storing the image data and the method of reading it out and displaying it according to the first embodiment are applicable also to a system which involves a network. The second embodiment illustrates a configuration for a case where the present invention is practiced via a network.

Figure 6:
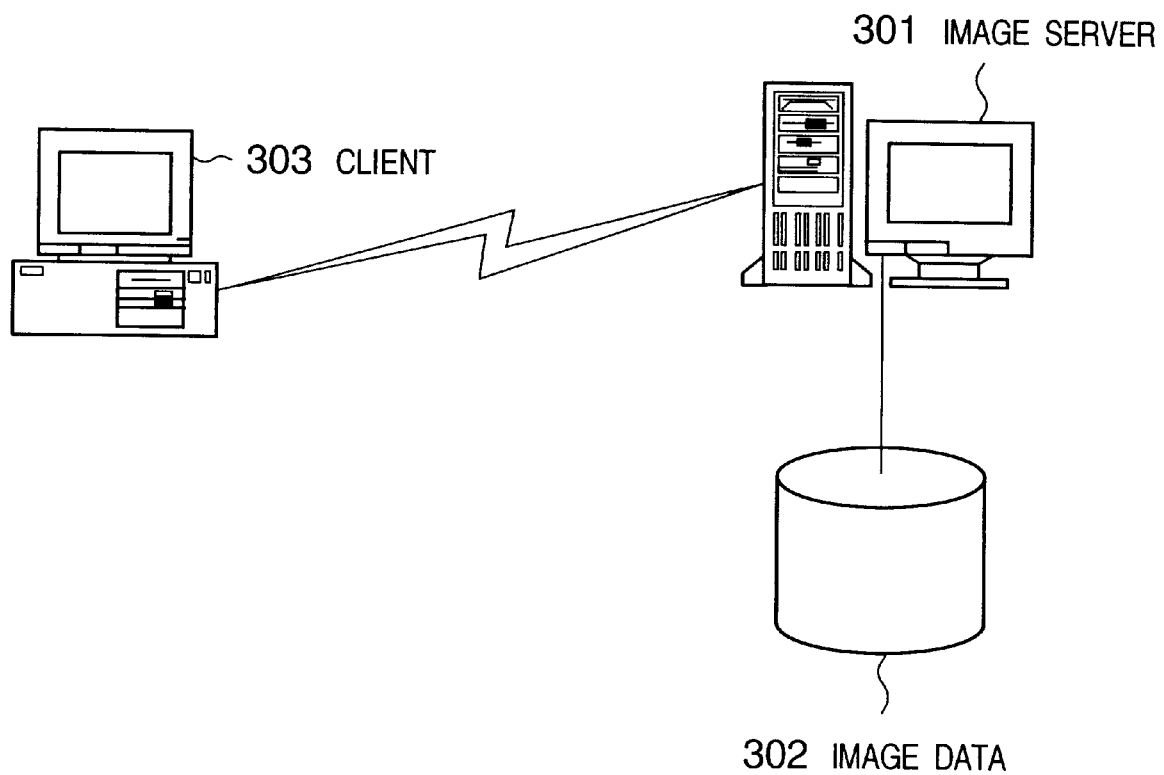
FIG. 6 is a diagram showing an example of the configuration of an image processing system according to a second embodiment of the present invention.

FIG. 6 is a diagram showing an example of the configuration of an image processing system according to a second embodiment of the present invention.

The system shown in FIG. 6 includes a database 302 for storing image data, an image server 301 connected to the image database 302 for receiving a request signal from a client 303 and sending an answer back to the client 303, and the client 303, which is operated by a user.

Figure 7:
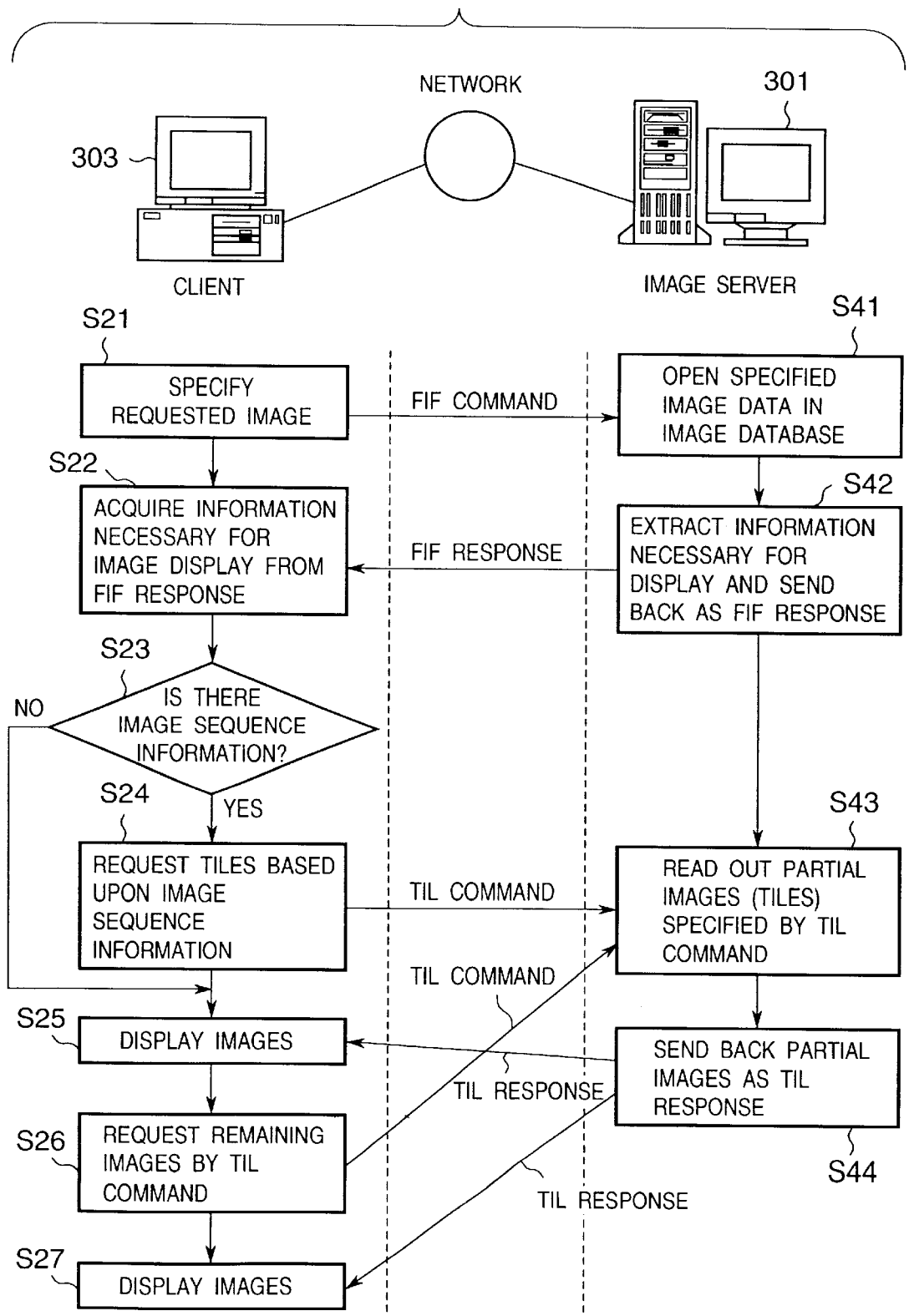
FIG. 7 is a diagram useful in describing the form of communication between a server and a client in the second embodiment.

FIG. 7 is a diagram useful in describing the form of communication between the image server 301 and the client 303 in the second embodiment of the present invention.

In the configuration of FIG. 7, a command is sent from the client 303 to the server 301, and a response is sent from the server 301 to the client 303 in answer to the command.

A FIF command is sent from the client 303 to the server 301 at the start of communication and specifies an image file name in the image database 302 possessed by the server 301. A FIF response, which is in answer to the FIF command, transmits such information as numbers of pixels in the vertical and horizontal directions, number of bits of image data per pixel, compression scheme, tile size and number of pixels, from the server 301 to the client 303. This information is necessary to display the image. If the display list property 4b described in FIG. 3 has been set, then the display list property 4b also is transmitted in the FIF response as information indicative of tile display sequence.

A TIL command/response is a command/response relating to the sending and receiving of partial image (tile) obtained by division of an image. In accordance with the TIL command, the identification number (tile number) of a partial image requested by the client 303 is transmitted by being attached to the command. In accordance with the TIL response, which is in answer to the TIL command, data representing the partial image requested by the TIL command is sent back.

The image display operation according to the second embodiment will now be described in accordance with FIG. 7. First, at step S21, the client 303 specifies the name of image data in the image database 302 of the server 301 by the FIF command. Upon receiving the FIF command, the server 301 retrieves the specified image data from the image database 302 and extracts the information (referred to as "image header information" below) necessary for displaying the obtained image at step S41. This is followed by step S42, at which the extracted image header information is sent to the client 303 as the FIF response. In a case where the display list property 4b has been attached to this image data, the display sequence information based upon the display list property 4b also is transmitted as part of the image header information.

Upon receiving the FIF response, the client 303 obtains the information such as the numbers of pixels and compression scheme from the image header information that was acquired at step S22. In a case where the image header information has display sequence information, the client 303 issues the TIL command, which requests tiles in accordance with the sequence indicated by the display sequence information (steps S23, S24).

Upon receiving this TIL command, the server 301 acquires the tiles, which have been specified by the TIL command, from the specified image data at step S43. The server 301 then sends back the acquired tiles at step S44 in accordance with the sequence set forth in the TIL command. This is the TIL response.

The client 303 receives the TIL response thus sent and displays the tiles mentioned therein (step S25). As a result, an image of the kind shown in FIG. 5 is displayed at the client 303 in accordance with the display sequence information of FIG. 3, by way of example.

Next, if necessary, the client 303 sends the identification numbers of the remaining partial images to the server 301 using the TIL command (step S26). As a result, the server 301 sends back as a TIL response the image data of the partial images specified by this TIL command (steps S43, S44). The client 303 accepts this TIL response and displays the tiles contained therein (step S27). As a result, an image containing all tiles is displayed, as shown in FIG. 2.

In accordance with the second embodiment of the present invention, as described above, it is so arranged that when image data is sent to an apparatus connected via a network, the client is instructed of the display sequence of partial images that conforms to the intentions on the side of the image producer and tiles can be displayed in accordance with the specified display sequence. When communication of an image is carried out via a network having a low transmission speed, as in the case of the Internet, for example, adopting the function described above makes it possible to display the important portions of the image first, thereby enhancing the usability of the image display.

Figure 8A:
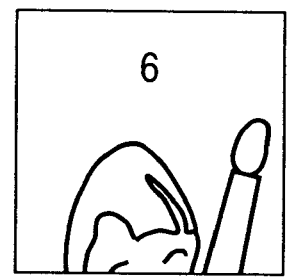
FIGS. 8A to 8C are diagrams useful in describing a state in which tiles are displayed successively in a rectangular area equivalent to one tile.
Figure 8B:
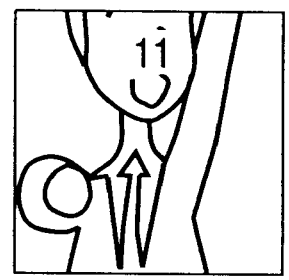
Figure 8C:
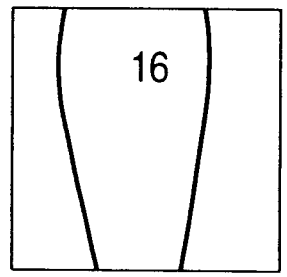

Furthermore, if the display area (size of the display screen) of the image at the client 303 is smaller than the overall image, the following effect is obtained: If the display area on the side of the client 303 is the same as a single tile of the image shown in FIG. 2, for example, displaying the tiles 6, 11, 16 sequentially in the order mentioned makes it possible to obtain an effect wherein one picture is observed as if being magnified by a loupe (FIGS. 8A to 8C).

In addition, there may be instances in which the image display area on the side of the client 303 is equivalent to a plurality of tiles. If the display area is equivalent to 2×2 tiles, for example, partial images may be displayed by being successively overwritten in units of four tiles each in the following manner, by way of example: tiles (6, 7, 11, 12), (13, 14, 18, 19), (3, 4, 8, 9) in FIG. 2. This example is illustrated in FIGS. 9A to 9C. It goes without saying that in a case where a plurality of tiles are successively displayed, as shown in FIGS. 9A to 9C, the display may be updated by superimposing some of the tiles in the following manner: tiles (6, 7, 11, 12)→(12, 13, 17, 18)→(13, 14, 18, 19). In these cases the number of values corresponding to each of the properties of display list property 4b would be four.

[Third Embodiment]

Figure 10:
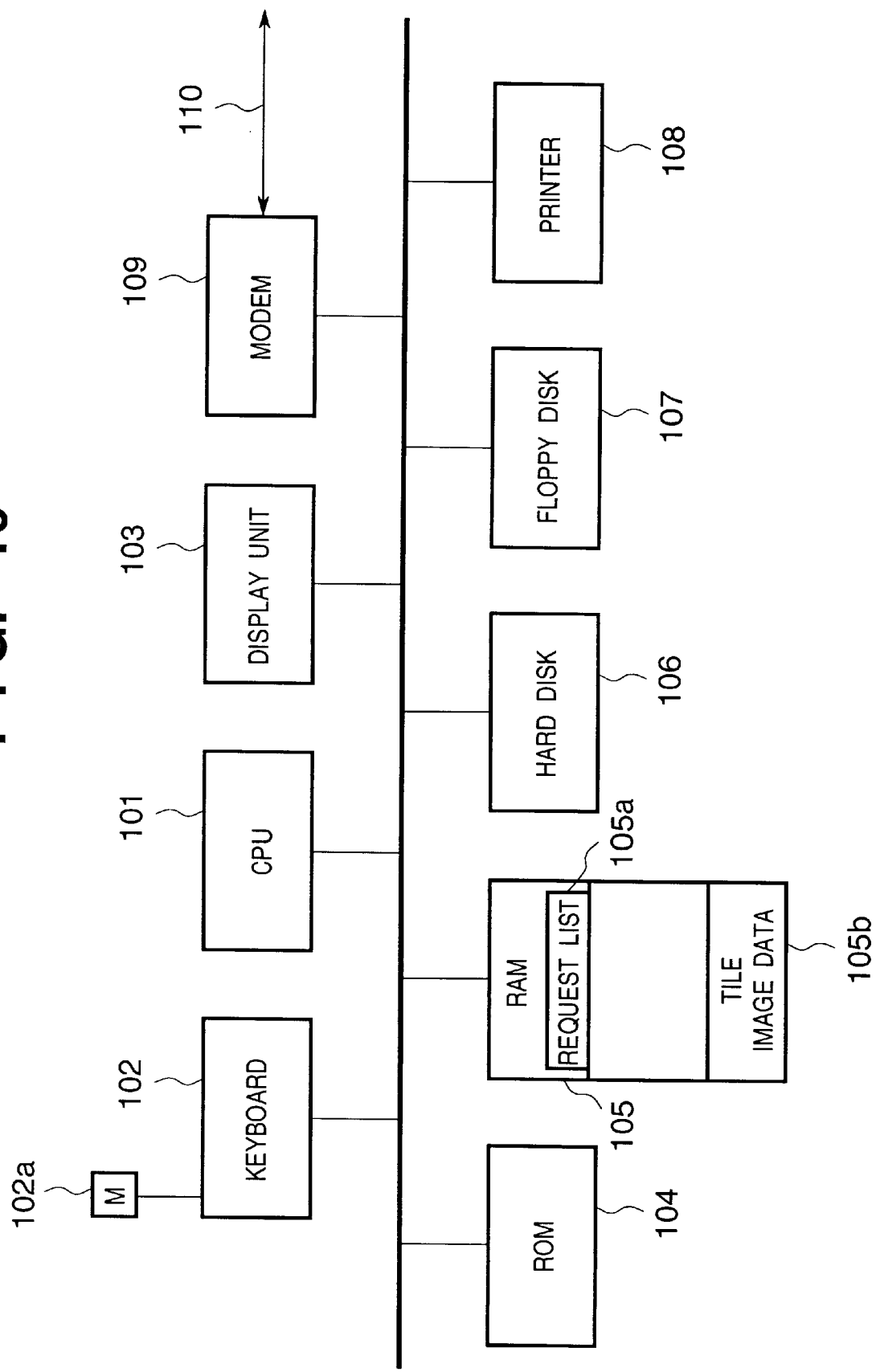
FIG. 10 is a block diagram showing the construction of a client according a third embodiment of the present invention.

FIG. 10 is a block diagram showing the construction of an image processing apparatus (client) according to a third embodiment of the present invention.

As shown in FIG. 10, the apparatus includes a CPU 101 for controlling the overall apparatus in accordance with a program stored in a hard disk 106 and loaded into a RAM 105. A keyboard 102 along with a mouse 102a is used to input various commands and data to the system of this embodiment. A display unit 103 has a CRT of a liquid crystal display device. The apparatus further includes a ROM 104. The RAM 105 constitutes the storage unit in the system of this embodiment and stores the program executed by this apparatus and data utilized by the system. The RAM 105 has a request list 105a, described later, in which priority information indicating a tile display sequence has been stored. A floppy disk device 107 constitutes an external storage device used in a file system employed in the system of this embodiment. Numeral 108 denotes a printer. A modem 109, which is connected to a line 110 comprising a communication line or a network such as a LAN, is for communicating with a server or another terminal connected to the line 110. It should be noted that the CPU 101, keyboard 102, display unit 103, ROM 104, RAM 105, hard disk 106 and floppy disk 107 in FIG. 10 correspond to the CPU 1, input unit 5, display 6, ROM 2, RAM 3, external storage device 4 and disk drive 7 shown in FIG. 1.

Figure 11:
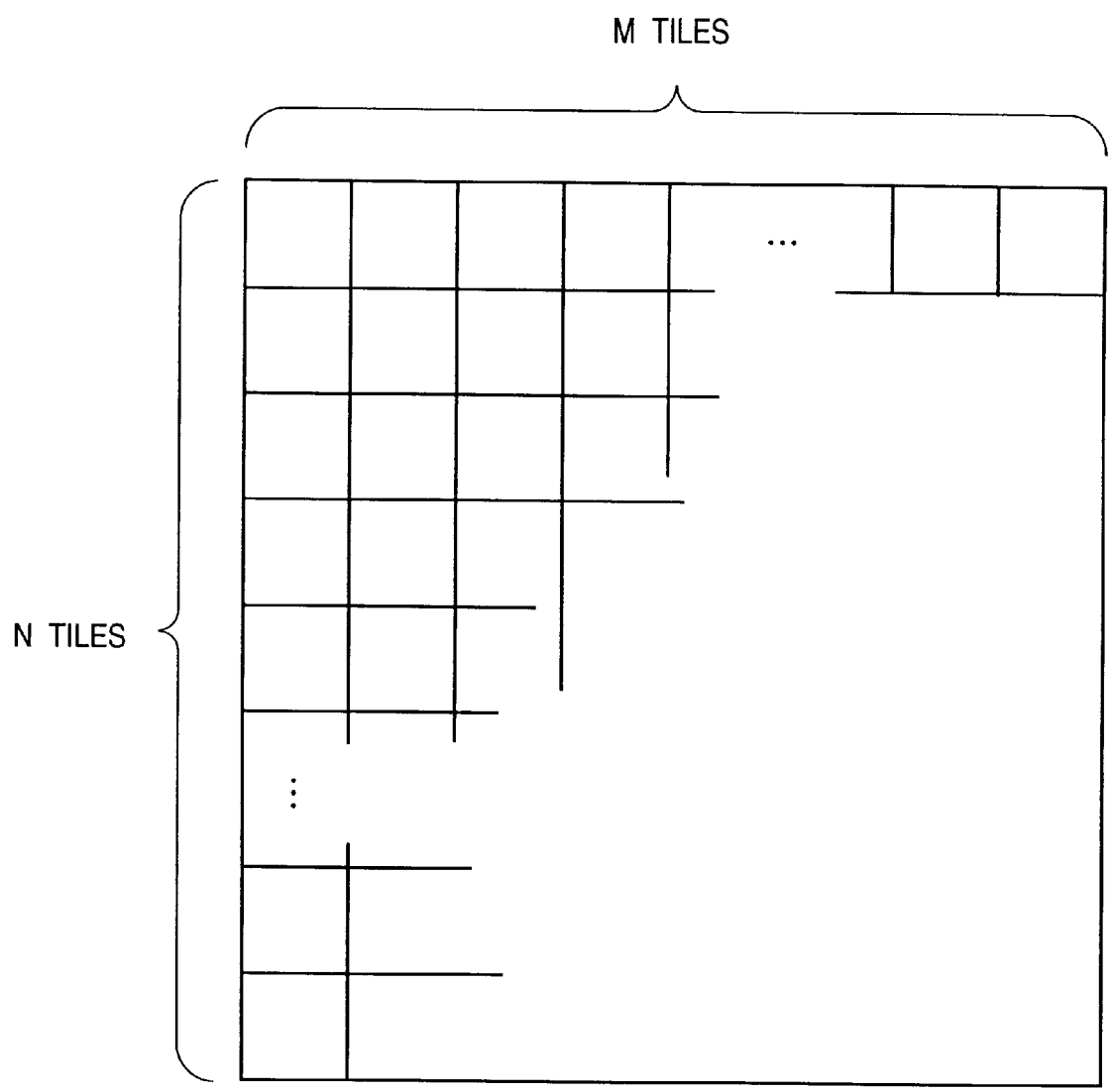
FIG. 11 is a diagram useful in describing the constitution of a screen in a case where an image is displayed upon being divided into N×M partial images.

A plurality of tile images serving as the components of an image have been stored in the hard disk 106. As shown in FIG. 11, M×N tile images selected from these tile images are combined by being arrayed in M-number of images horizontally and N-number of images vertically, thereby creating an image. The image thus created is stored as an image file in the hard disk 106 and is displayed on the CRT 103 or printed out by the printer 108. Examples of the image format are the above-mentioned FlashPix and TIFF formats, etc.

Figure 12:
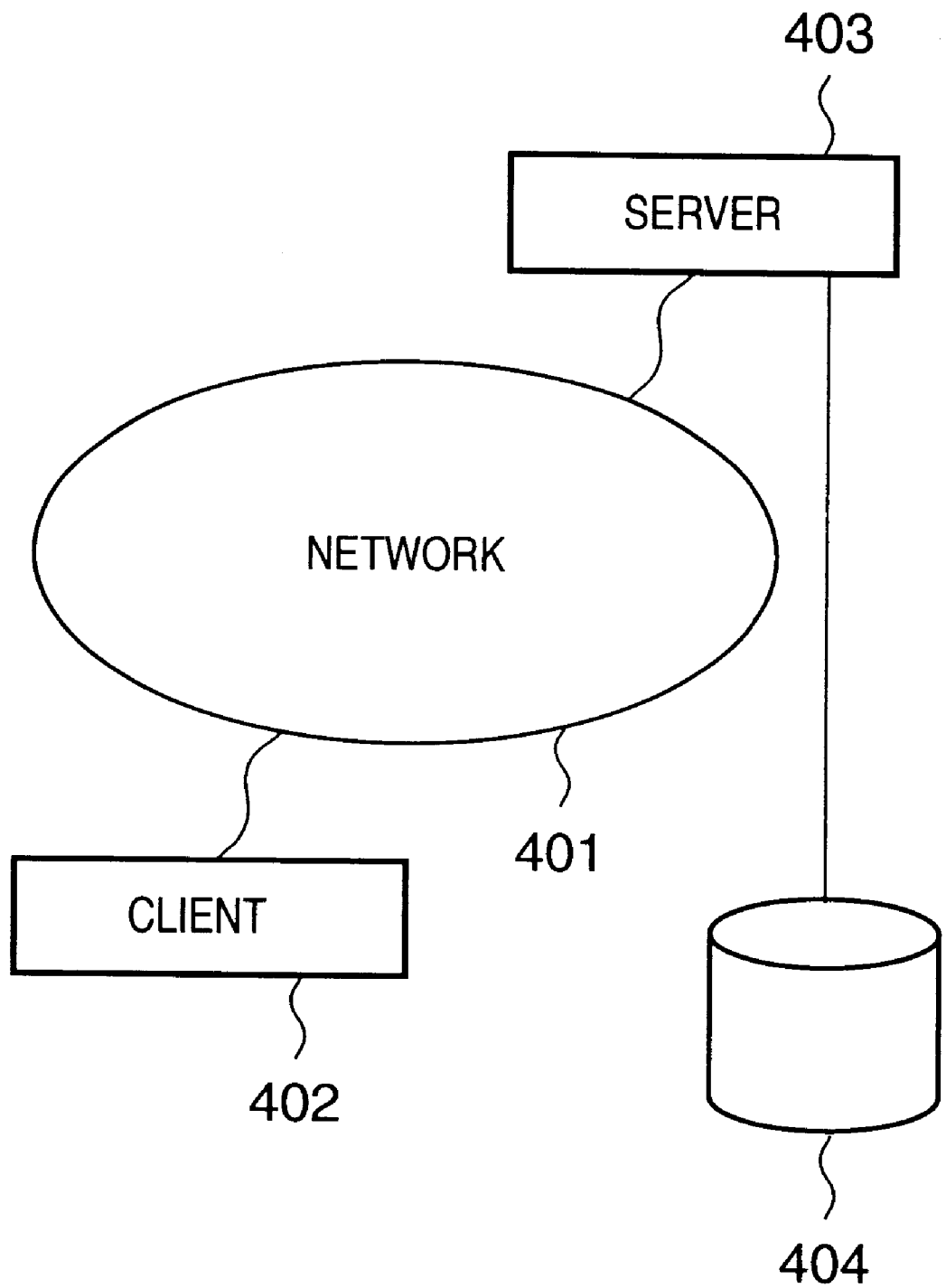
FIG. 12 is a conceptual view showing the configuration of a computer system according to the third embodiment.

FIG. 12 is a conceptual view showing the configuration of a computer system according to the third embodiment. It is assumed that the arrangement illustrated in FIG. 10 is included in a client 402 shown in FIG. 12.

The client 402 in the computer system of FIG. 12 is connected to a server 403 via a network 401. In accordance with a request from the client 402, the server 403 transmits image data, which has been stored in an image database on a hard disk 404, to the client 402 via the network 401. The image data is stored on the hard disk 404 in a hierarchical structure in conformity with magnification ratio, resolution, etc. By transmitting the image data having the requested magnification ratio (resolution) by the client 402, from the server 403 to the client 402, which issued the request, together with the above-mentioned image header information, the client 402 is capable of receiving the image data and displaying the specified image at the specified magnification ratio (resolution).

Figure 13:
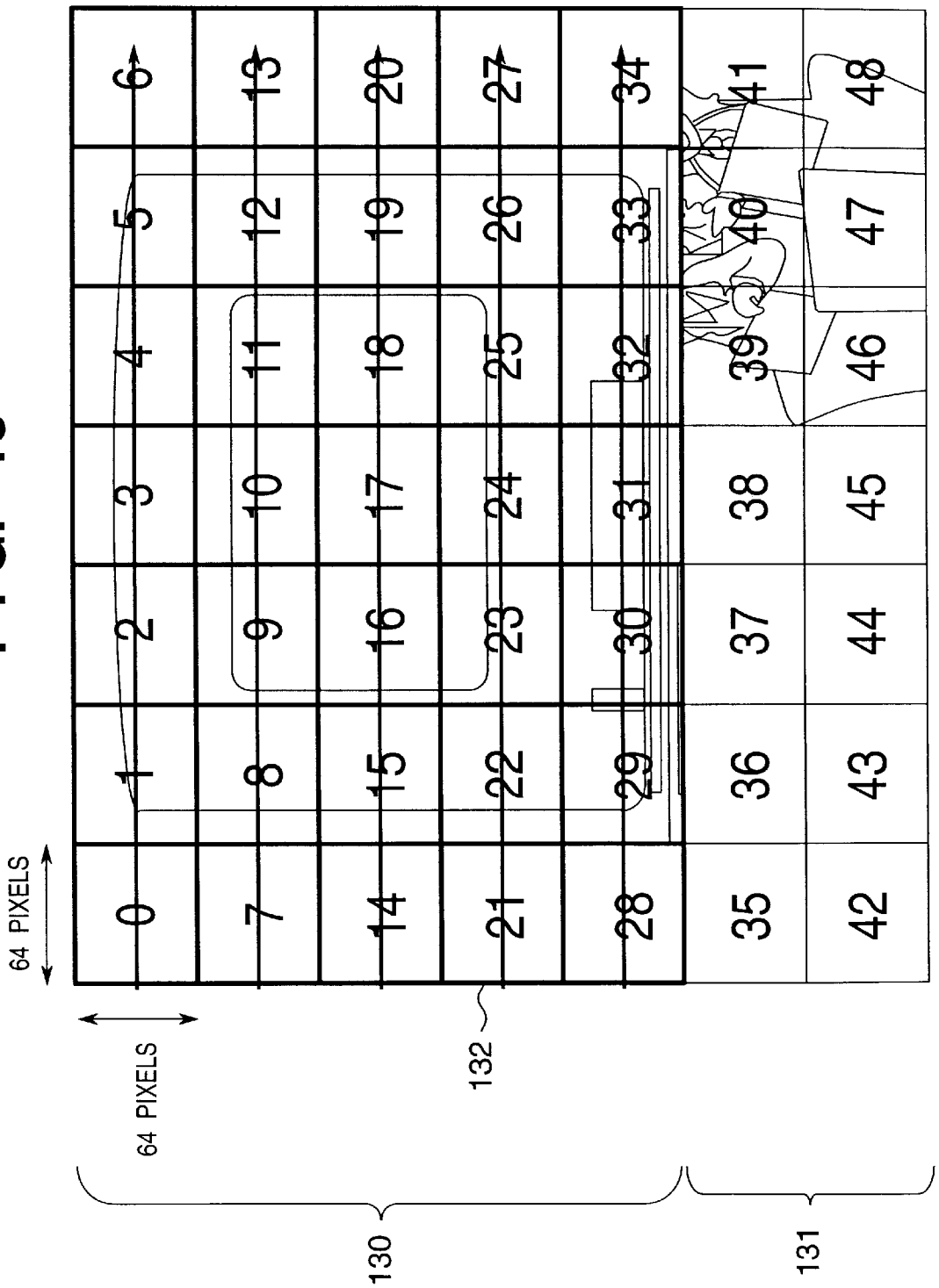
FIG. 13 is a diagram in accordance with the third embodiment showing an example in which display of an enlarged image at a client is currently in progress.

FIG. 13 is a diagram in accordance with the third embodiment showing an example in which display of an enlarged image at the client 402 is currently in progress.

An image-extraction request list 105a that indicates from which tile an image is to be successively displayed is provided in the RAM 105. Tiles are displayed in an order designated by the request list 105a. FIG. 14 illustrates an example of the organization of data in the image-extraction request list 105a. The request list 105a may be one that is the same as the display list property 4b shown in FIG. 2. As shown in FIG. 14, values of priority indicating tile extraction numbers are arranged in ascending order starting from "0". Tile numbers are stored successively in the order of priority, i.e., tile number "0" for priority "0", which is the highest priority, tile number "1" for priority "1", which is the next highest priority, tile number "2" for priority "2", which is the next highest priority, and tile number "3" for priority "3", which is the next highest priority, and so on. An "EOL" code indicating the end of the list is stored at the end of the request list 105a. The display priority of each tile image in the image-extraction request list 105a can be set and changed at will using the keyboard 102 or mouse 102a, by way of example. It should be noted that the values of display priority shown in FIG. 14 correspond to the order in which tiles are displayed in the usual display.

Figure 18:
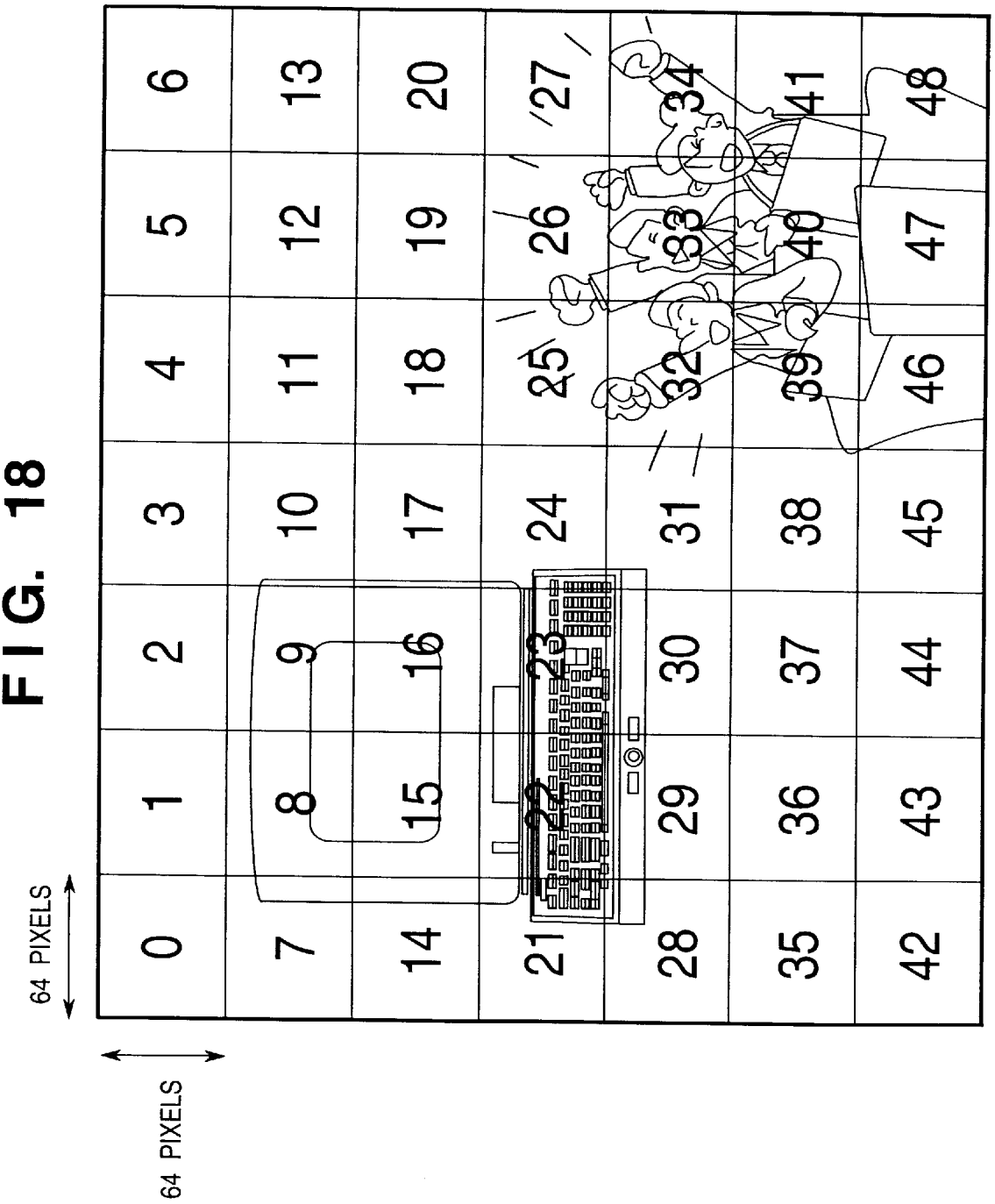
FIG. 18 is a diagram showing an example of an ordinary display of tile images.
Figure 19:
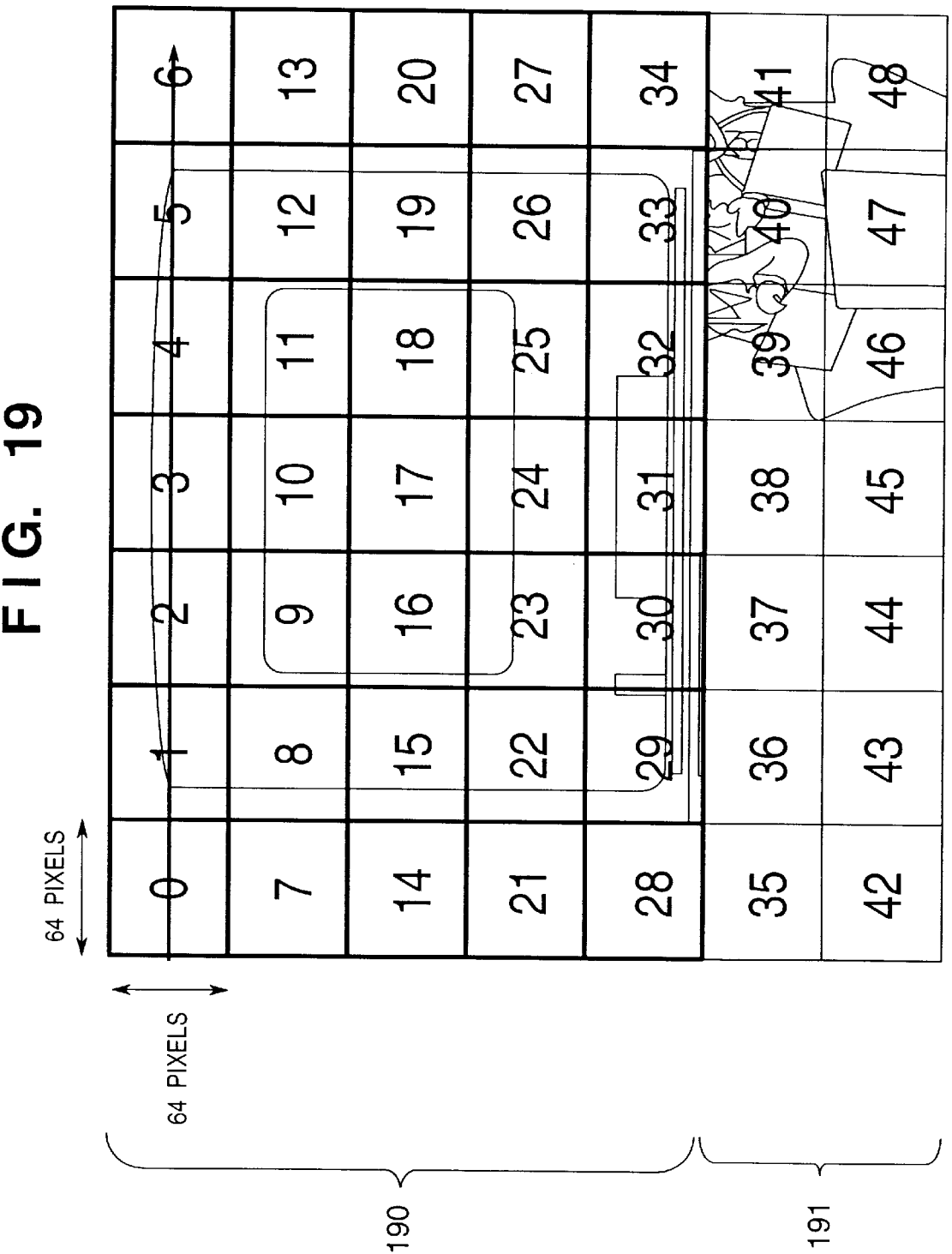
FIG. 19 is a diagram useful in describing an example of a display of an enlarged image according to the prior art.

An area 130 in FIG. 13 shows a display area in which an image that has undergone enlargement processing up to a tile having the priority "34" is displayed, while an area 131 shows a display area in which tiles 35 to 48 in FIG. 18, which have not yet been enlarged, are displayed. More specifically, FIG. 13 shows a state in which an image enlargement request has been sent from the client 402 to the server 403 via the network 401, enlarged image data has been transmitted from the server 403 to the client 402 in accordance with the request, the client 402 has received the enlarged image data and displayed it in order from the tile of tile number "0" in accordance with the priority stored in the request list 105a of FIG. 14, and display of tiles up to tile number "34", has been completed.

The particular operation will now be described.

Figure 15:
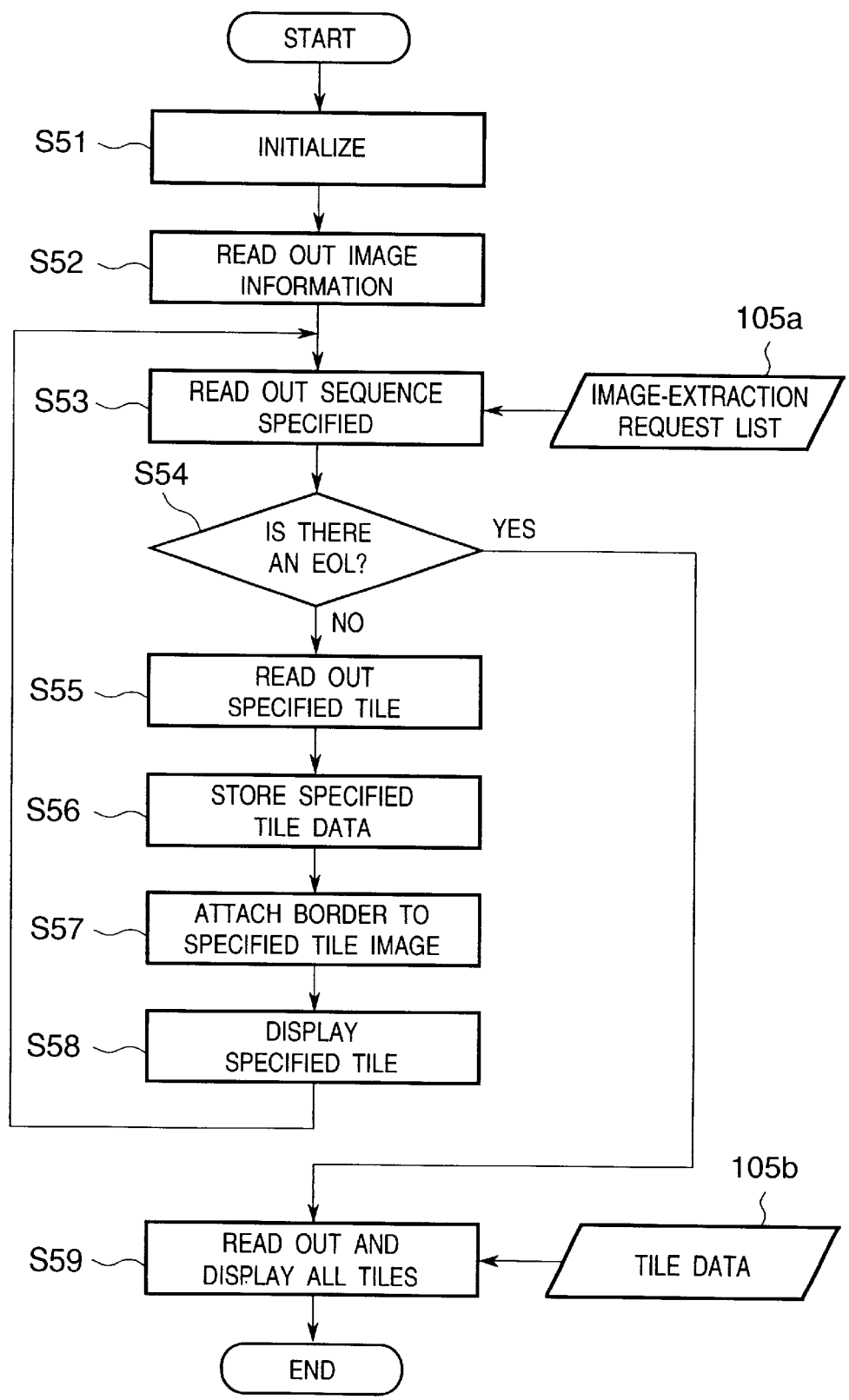
FIG. 15 is a flowchart useful in describing image display processing at a client according to the third embodiment.

FIG. 15 is a flowchart illustrating image enlargement and display processing at the client 402 according to the third embodiment of the invention.

First, at step S51, initialization processing is executed, a memory area in RAM 105 necessary to run the program is reserved and initial values are set. This is followed by step S52, at which information needed to display an image comprising a plurality of tiles (partial images) is accepted from the server 403. The information includes numbers of pixels (e.g., 1024×768 pixels) of the entire image in the vertical and horizontal directions, the number of bits of image data per pixel, the compression scheme, size (e.g., 64×64 pixels in this example) of the tiles and number (e.g., 49) of tiles, etc. Thus, an image containing 49 tiles, of the kind shown in FIG. 18, for example, is displayed. If, under the conditions shown in FIG. 18, the tile of tile 8 is specified and enlarged display of this tile is designated using, say, the keyboard 102, this fact is communicated to the server 403 via the network 401. Control then proceeds to step S53, at which reference is had to the image-extraction request list 105a to request the server 403 for the image data of this tile in order of descending priority in list 105a. This is carried out by the TIL command shown in FIG. 7.

When the image data (the TIL response) of the specified tile and enlargement ratio are sent from the server 403 in answer, control proceeds to step S55. The image data is received and the received image data is stored in the tile-data storage area 105b of RAM 105 (step S56). Next, at step S57, a border is attached to the received image data and the resulting data is stored in a display memory in RAM 105. As a result, the tile is displayed with a border 132, as shown in FIG. 13 (step S58). Though each tile in area 131 is shown having a border in FIG. 13 also, this is for the sake of convenience in order to indicate the position of each tile; these borders are not actually displayed on the screen of the display unit 103.

Figure 16:
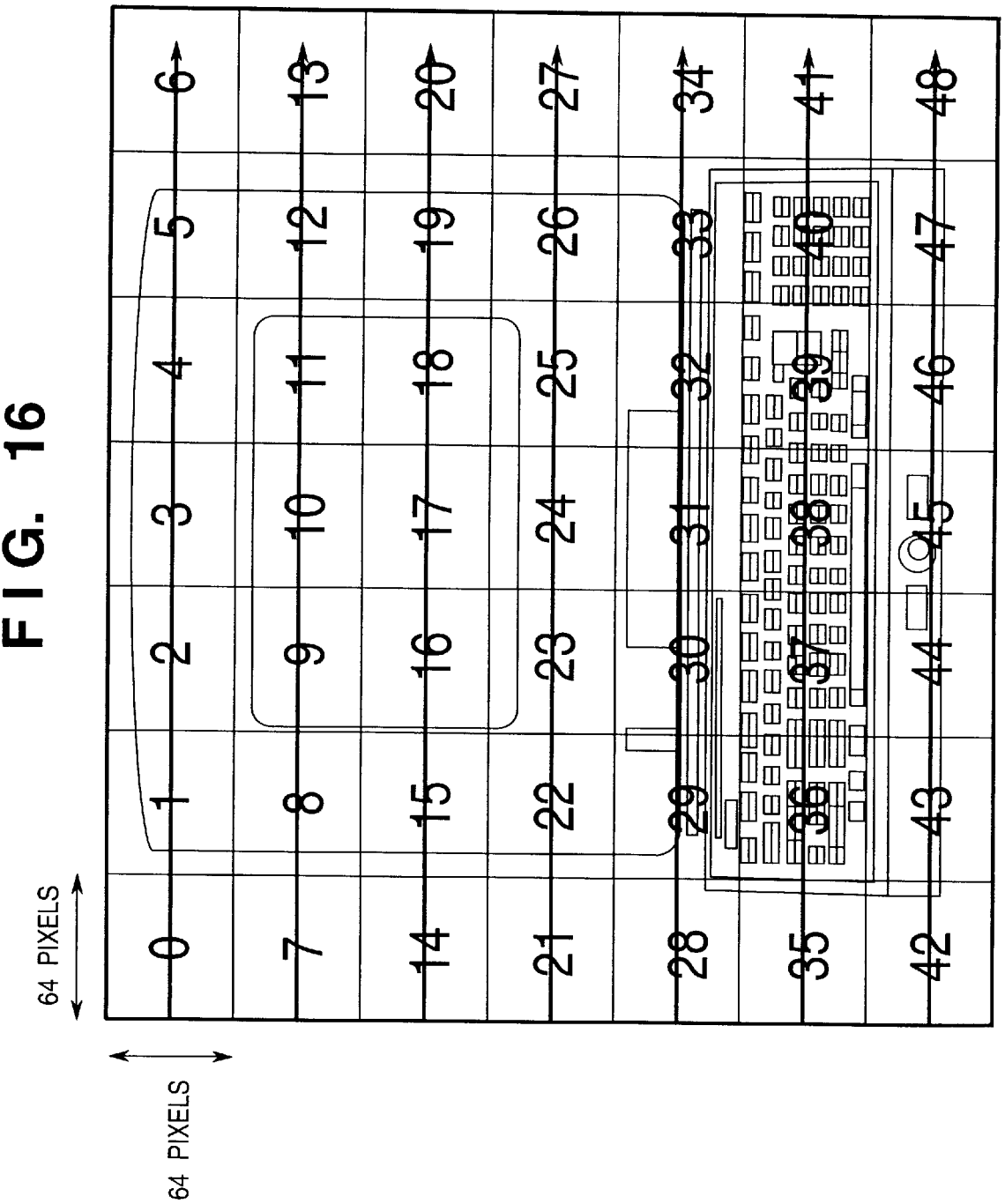
FIG. 16 is a diagram showing an example of display of a final enlarged image at a client according to the third embodiment.

Thus, tiles are displayed sequentially in the order of the tile display priorities stored in the image-extraction request list 105a. When the tile number corresponding to so a priority is the "EOL" code, extraction of tiles is terminated and control proceeds to step S59. Here all tile image data that has been stored in the tile-data storage area 105b of RAM 105 is read out and stored in the display memory of RAM 105. As a result, an enlarged image can be displayed in completed form (without a border), as depicted in FIG. 16. It should be noted that although the third embodiment has been described in accordance with an example in which tiles are displayed with borders, the present invention is not limited to such an arrangement. As long as there is some indication (specific information) of how far display of tiles has been completed, any form of display will suffice. In this embodiment, the specific information is described as being the tile borders.

The present invention can be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like running on the computer performs a part of or the entire process in accordance with the designation of program codes and implements the functions according to the embodiments.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image data processing apparatus comprising:
    first storage means for storing image data representing an image constituted by a plurality of tile images into which the image is segmented and reading out the image data in tile image units;
    second storage means for storing, in association with the image, sequence information specifying the tile images to be displayed and indicating a display sequence of specified tile images regardless of a display order of the tile images of the image;
    read-out means, upon displaying the image, for successively reading image data of the specified tile images out of said first storage means in tile image units, based upon the sequence information stored in said second storage means; and
    control means for controlling to display each specified tile image read out by said read-out means, in accordance with the display sequence.

2. The apparatus according to claim 1, wherein said first storage means stores each of the plurality of tile images with an identification code appended thereto, said sequence information consisting of the identification codes arranged in a desired sequence.

3. The apparatus according to claim 1, wherein if tile images of the image remain after read-out of tile images specified by the sequence information has ended, said read-out means reads out the remaining tile images in accordance with a predetermined sequence.

4. The apparatus according to claim 1, wherein if the sequence information has not been appended to the image that is the object read-out, said read-out means reads out all tile images of the image in accordance with a predetermined sequence.

5. The apparatus according to claim 1, wherein said control means controls to display tile images, which have been read out by said read-out means, by overwriting the tile images in units of a predetermined number thereof.

6. An image-data processing method for reading image data out of a memory and processing the image data, wherein the memory stores the image data representing an image composed of a plurality of tile images and reading out the image data in tile image units, comprising:

a storage step of storing sequence information specifying the tile images to be displayed and indicating a display sequence of specified tile images in association with an image, regardless of a display order of the tile images of the image;

a read-out step of successively reading out each of the specified tile images based upon the sequence information upon displaying the image; and a control step of controlling to display each specified tile image read out at said read-out step, in accordance with the display sequence.

7. The method according to claim 6, wherein each of the plurality of tile images is stored with an identification code appended thereto, said sequence information consisting of the identification codes arranged in a desired sequence.

8. The method according to claim 6, wherein if tile images of the image remain after read-out of tile images specified by the sequence information has ended, said read-out step reads out the remaining tile images of the image in accordance with a predetermined sequence.

9. The method according to claim 6, wherein if the sequence information has not been appended to the image that is the object read-out, said read-out step reads out all tile images of the image in accordance with a predetermined sequence.

10. The method according to claim 6, wherein said control step controls to display tile images, which have been read out at said read-out step, by overwriting the tile images in units of a predetermined number thereof.

11. An image processing system which includes a client and a server connected via a communication line, wherein said server includes:

first storage means for storing image data representing an image constituted by a plurality of tile images into which the image is segmented and reading out the image data in tile image units;

second storage means for storing, in association with the image, sequence information specifying the tile images to be displayed and indicating a display sequence of specified tile images regardless of a display order of the tile images of the image;

read-out means for successively reading each of the specified tile images of the image out of said first storage means based upon the sequence information stored in said second storage means, upon displaying the image;

first transmitting means, responsive to issuance of a request for an image from a client, for obtaining the sequence information related to the image from said second storage means and transmitting the sequence information to the client that issued the request for the image; and second transmitting means, responsive to a request for an image from a client, for reading the specified tile images of the image out of said first storage means and transmitting the specified tile images to the client that issued the request for the image, in accordance with the display sequence; and said client includes:

first issuing means for issuing the request for an image to the server;

second issuing means for issuing the request for the image to the server so that the specified tile images of the image are acquired in accordance with the display sequence based upon the sequence information transmitted by said first transmitting means; and display control means for controlling to successively display the specified tile images transmitted by said second transmitting means of the server, in accordance with the display sequence.

12. The system according to claim 11, wherein said first storage means stores each of the plurality of tile images with an identification code appended thereto, said sequence information consisting of the identification codes arranged in a desired sequence.

13. The system according to claim 11, wherein if tile images of the image remain after read-out of tile images specified by the sequence information has ended, said second issuing means reads out the remaining tile images in accordance with a predetermined sequence.

14. The system according to claim 11, wherein if the sequence information has not been appended to the image that is the object read-out, said second issuing means issues a request for tile images so that all tile images of the image will be read out in accordance with a predetermined sequence.

15. The system according to claim 11, wherein said display control means controls to display tile images, which have been transmitted in accordance with the request for tile images by said second issuing means, by overwriting the tile images in units of a predetermined number thereof.

16. An image data processing method for displaying an image that has been divided into a plurality of tile images, comprising:

a specifying step of specifying tile images of the image to be displayed;

an input step of inputting image data of each of the tile images specified in said specifying step, in accordance with a predetermined display sequence of the specified tile images, regardless of a display order of the tile images of the image;

an accumulating step of storing the image data of the specified tile images input at said input step into a memory; and a control step of appending specific information to the image data of the specified tile images input at said input step, and controlling to display the specified tile images in accordance with the predetermined display sequence.

17. The method according to claim 16, further comprising a re-display control step of controlling to display the plurality of tile images, without appending the specific information, after all of the image data of the plurality of tile images has been stored in the memory.

18. The method according to claim 16, wherein the image data is input via a communication line at said input step.

19. The method according to claim 16, wherein said input step includes:

a specifying step of specifying a number of a tile image that is to be displayed; and a step of receiving image data of the tile image sent in conformity with the number specified at said specifying step.

20. The method according to claim 16, further comprising a step of specifying the display sequence of the tile images.

21. An image data processing apparatus for displaying an image that has been divided into a plurality of tile images, comprising:

storage means for storing information specifying tile images and indicating a display sequence of specified tile images regardless of a display order of the tile images of the image;

input means for inputting image data of each of the specified tile images in accordance with the information stored in said storage means;

storage means for storing the image data of the specified tile images input by said input means; and control means for controlling to append specific information related to the display sequence to the image data of the specified tile images input by said input means, and to display each of the specified tile images in accordance with the display sequence included in the information.

22. The apparatus according to claim 21, further comprising means for controlling to display the plurality of tile images, without appending the specific information, after all of the image data of the plurality of tile images has been stored in said storage means.

23. The apparatus according to claim 21, wherein said input means inputs the image data via a communication line.

24. The apparatus according to claim 21, further comprising specifying means for specifying a number of a tile image that is to be displayed;

wherein said input means inputs image data sent in conformity with the number specified by said specifying means.

25. The apparatus according to claim 21, further comprising means for changing the display sequence that has been stored in said storage means.

26. A computer-readable storage medium storing a program for implementing an image data processing method for reading image data out of a memory and processing the image data, wherein the memory stores image data representing an image constituted by a plurality of tile images into which the image is segmented and reading out the image data in tile image units, comprising:

a storage-step module of storing sequence information specifying the tile images to be displayed and indicating a display sequence of specified tile images, in association with the image regardless of a display order of the tile images of the image;

a read-out-step module of successively reading out each of the specified tile images based upon the sequence information upon displaying the tile images; and a control-step module of controlling to display each specified tile image in accordance with the display sequence.

27. The storage medium according to claim 26, wherein each of the plurality of tile images is stored with an identification code appended thereto, said sequence information consisting of the identification codes arranged in a desired sequence.

28. The storage medium according to claim 26, wherein if tile images of the image remain after read-out of tile images specified by the sequence information has ended, said read-out-step module reads out the remaining tile images in accordance with a predetermined sequence.

29. The storage medium according to claim 26, wherein if the sequence information has not been appended to the image that is the object read-out, said read-out-step module reads out all tile images of the image in accordance with a predetermined sequence.

30. The storage medium according to claim 26, wherein said control-step module controls to display tile images, which have been read out by said read-out-step module, by overwriting the tile images in units of a predetermined number thereof.

31. A computer-readable storage medium storing a program for implementing an image data processing method for displaying an image that has been divided into a plurality of tile images, comprising:

a specifying step of specifying tile images of the image to be displayed;

an input-step module of inputting image data of each of the specified tile images of an image in accordance with a predetermined display sequence of the specified tile images, regardless of a display order of the tile images of the image;

a storing-step module of storing the image data of the specified tile images input by executing said input-step module into a memory; and a display control-step module of controlling to append specific information to the image data of the specified tile images input by executing said input-step module, and to display each of the specified tile images in accordance with the display sequence.

32. The storage medium according to claim 31, further comprising a re-display control-step module of controlling to display the plurality of tile images, without appending the specific information, after all of the image data of the plurality of tile images has been stored in the memory.

33. The storage medium according to claim 31, wherein the image data is input via a communication line by said input-step module.

34. The storage medium according to claim 31, wherein said input-step module includes:

a specifying-step module of specifying a number of a tile image that is to be displayed; and a step module of receiving image data of the tile image sent in conformity with the number specified by executing said specifying-step module.

35. The storage medium according to claim 31, further comprising a step module of specifying the display sequence of the tile images.

36. An image data processing method for controlling to display an image that has been divided into a plurality of tile images, comprising:

a specifying step of specifying tile images of the image to be displayed:

an input step of inputting image data of each of the specified tile images specified in said specifying step; and a control step of controlling to append sequence information to the image data of the specified tile images input at said input step, and to display each of the specified tile images in accordance with an order defined by the sequence information, regardless of a display order of the tile images of the image.

37. The method according to claim 36, further comprising a request step of requesting the image data of each of the plurality of tile images corresponding to the image.

38. The method according to claim 37, wherein the image data of each of the plurality of tile images is input via a communication line at said input step.

39. An image data processing apparatus for displaying an image that has been divided into a plurality of tile images, comprising:

input means for inputting image data of each of the plurality of tile images corresponding to the image; and control means for controlling to append sequence information specifying tile images and indicating a display sequence of the specified tile images, to the image data of each of the tile images input by said input means, and to display each of the specified tile images in accordance with the display sequence defined by the sequence information regardless of a display order of the tile images of the image.

40. The apparatus according to claim 39, further comprising request means for requesting the image data of each of the plurality of tile images corresponding to the image.

* * * * *

UNITED STATES PATENT AND TRADEMARK OFFICE
CERTIFICATE OF CORRECTION

PATENT NO.    : 6,714,205 B1
DATED         : March 30, 2004
INVENTOR(S)   : Miyashita et al.

It is certified that error appears in the above-identified patent and that said Letters Patent is hereby corrected as shown below:

Column 3,
Line 38, "according" should read -- according to --.

Column 4,
Line 35, "is" should read -- in --; and
Line 39, "vertical" (second occurrence) should read -- horizontal --.

Column 8,
Line 16, "images'" should read -- images --.

Column 9,
Line 53, "so" should be deleted.

Signed and Sealed this

Third Day of August, 2004

JON W. DUDAS
*Acting Director of the United States Patent and Trademark Office*